No. 870,935. PATENTED NOV. 12, 1907.
L. COLSON & C. GEBAUER.
AUTOMATIC SWITCH GOVERNOR.
APPLICATION FILED JUNE 25, 1907.
2 SHEETS—SHEET 1.
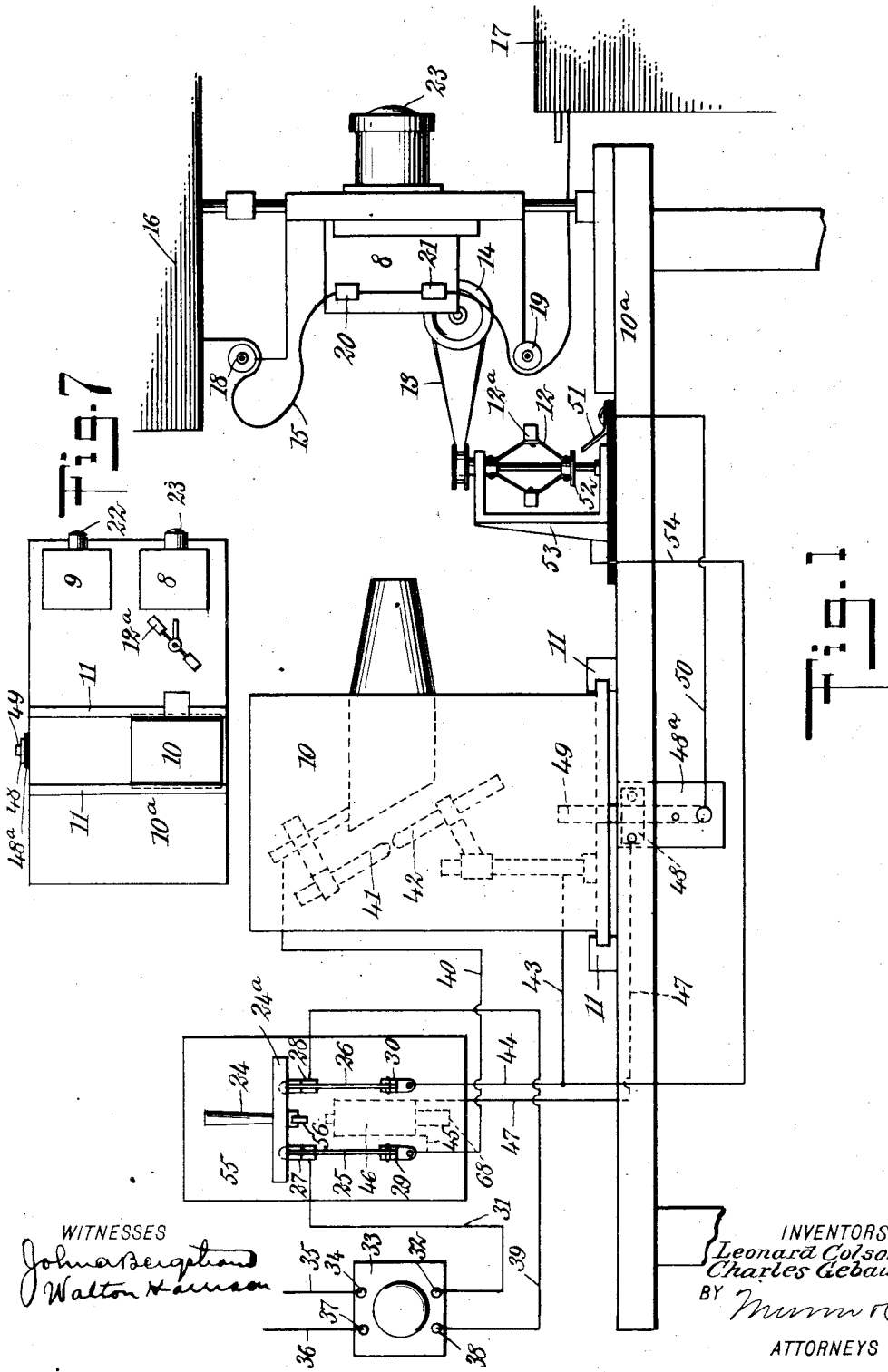
WITNESSES
INVENTORS
Leonard Colson
Charles Gebauer
BY
ATTORNEYS

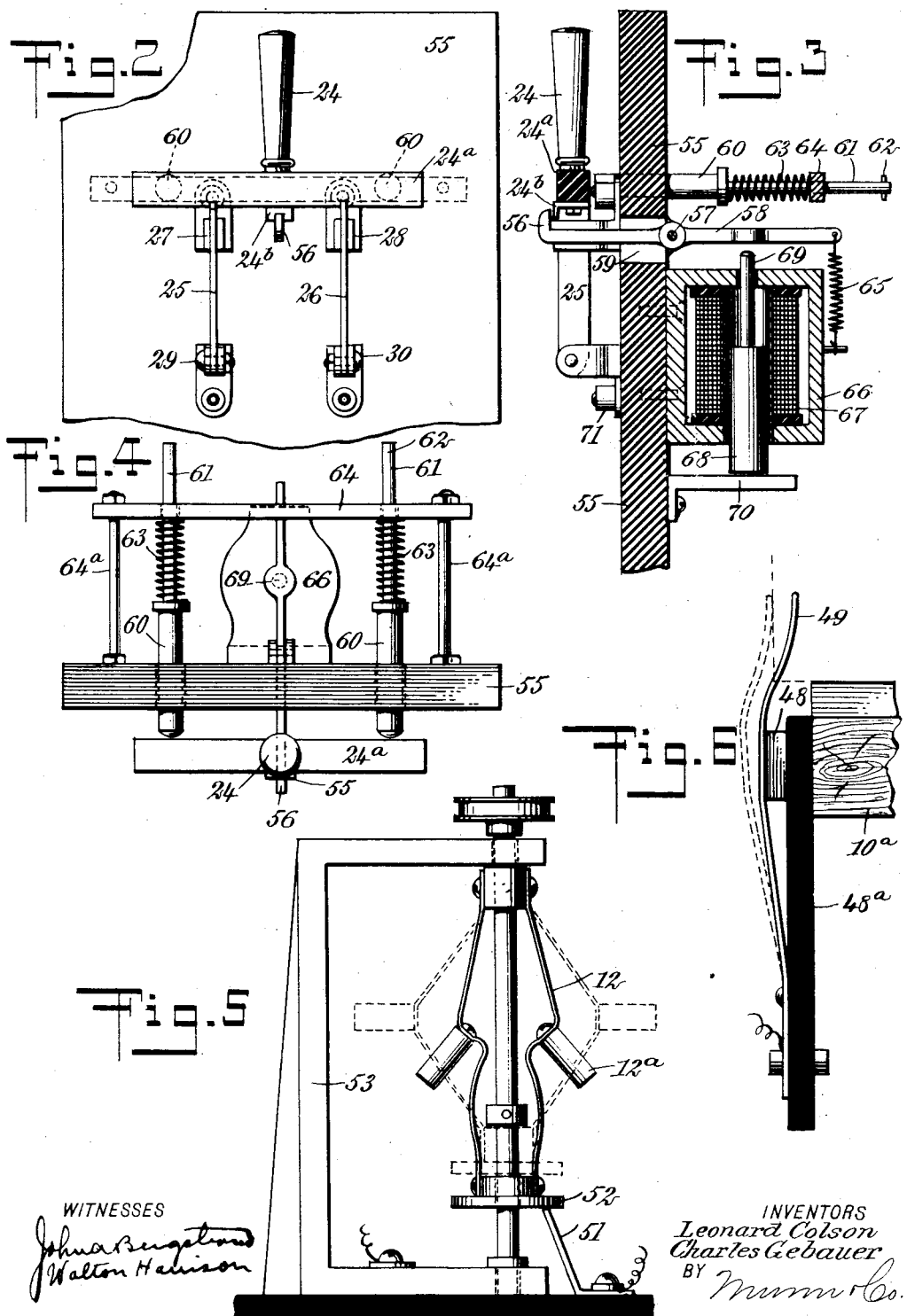

UNITED STATES PATENT OFFICE.

LEONARD COLSON AND CHARLES GEBAUER, OF NEW YORK, N. Y.; SAID COLSON ASSIGNOR TO SAID GEBAUER.

AUTOMATIC SWITCH-GOVERNOR.

No. 870,935.　　　　Specification of Letters Patent.　　　　Patented Nov. 12, 1907.

Application filed June 25, 1907. Serial No. 380,814.

*To all whom it may concern:*

Be it known that we, LEONARD COLSON and CHARLES GEBAUER, both citizens of the United States, and residents of the city of New York, borough of Brooklyn, in the county of Kings and State of New York, have invented a new and Improved Automatic Switch-Governor, of which the following is a full, clear, and exact description.

Our invention relates to automatic switch governors, our more particular object being to produce a mechanism of this type suitable for use in connection with stereopticons and with projectors for moving pictures, and in which the lamp is automatically extinguished in case the mechanism moving the film of the projector is stopped, so that the heat from the lamp endangers the film.

Our invention further relates to means whereby the lamp may be kept burning even when the film of the projector is motionless or has a lower speed, provided the lamp is for the moment used in connection with a stereopticon and independent of the projector for moving pictures.

Our invention also relates to certain details of construction whereby the general efficiency of the lamp and its associated parts are greatly improved.

Reference is to be had to the accompanying drawings forming a part of this specification, in which similar characters of reference indicate corresponding parts in all the figures.

Figure 1 is a side elevation, partly diagrammatic, showing our invention as comprising a movable electric lamp used in connection with a projector for moving pictures and with a stereopticon, the position of the lamp and also the condition of the projector determining whether the lamp is lighted or not; Fig. 2 is a fragmentary elevation of the electrically operated switch employed for opening the circuit when the lamp occupies a certain predetermined position, or when the mechanism for moving the film through the projector stops or moves so slowly that the film is endangered by heat from the lamp; Fig. 3 is a central vertical section through the switch indicated in Fig. 2, and shows a solenoid and other mechanism for opening the switch so as to extinguish the lamp; Fig. 4 is a fragmentary plan of the switch board shown in Figs. 2 and 3, this view indicating how the switch is opened when the solenoid is energized; Fig. 5 is a side elevation of the governor and its contact mechanism, used for opening and closing the circuit controlling the solenoid shown in Fig. 3; Fig. 6 is a side elevation of the switch shown in the upper part of Fig. 7, and opened by the lamp 10 when the latter occupies one of its extreme positions, the opening of this switch serving to prevent the governor contact from closing the circuit of the solenoid when the lamp occupies a position adjacent to the stereopticon rather than to the projector for moving pictures; and Fig. 7 is a reduced plan view of the table upon which rest the lamp, the stereopticon and the projector for moving pictures.

The projector for moving pictures may be seen at 8 (Fig. 7), the stereopticon at 9 and the electric lamp 10, slidable upon the ways 11, may be moved into registry with either the projector or the stereopticon, as desired. The offices of the stereopticon and the projector are independent to the extent that the same source of light is employed in each so that the use of the projector is alternated, if desired, by the use of the stereopticon.

It is a known fact that a powerful light is needed both for the projector and for the stereopticon, and it is also known that the heat incidental to this light endangers the film used with the projector, this film being ordinarily of celluloid or other highly combustible material. This danger is so great that if the film stops moving for a few seconds or even if its speed drops below a certain definite limit, the film is liable to take fire and thus produce a conflagration, besides irreparably damaging much of the apparatus. Hence, it is desirable, in case the film should stop or slow up, that the lamp shall be automatically extinguished. It is also desirable that when the lamp is moved away from the projector and used for illuminating the stereopticon, the mechanism used for extinguishing the lamp shall be, for the moment, inoperative so that the burning of the lamp continues independently of the motion of the film of the projector, or rather independent of the movable parts used for propelling this film.

The desired results just mentioned are attained by aid of our apparatus. For convenience many of the parts are mounted upon a table 10ᵃ. At 12 is shown a centrifugal governor provided with weights 12ᵃ and movable by a belt 13, the latter being propelled by mechanism 14 used for moving the film 15. This film passes through the projector 8 in the manner well known and is partially stored within two magazines 16, 17 and moves around rollers 18, 19 from one of these magazines into the other. Guides 20, 21 support the film, and the light from the electric lamp is thrown upon that portion of the film intermediate of the guides. Lens holders 22, 23, of usual construction, are mounted respectively upon the stereopticon and the projector.

Referring now to the left of Fig. 1, it will be seen that at 24 is a switch handle mounted upon a movable bar 24ᵃ, the latter being supported upon switch knives 25, 26 which are adapted to engage contact members 27, 28. The switch knives are mounted upon pivotal connections 29, 30 in the usual manner. From the contact member 27 a wire 31 leads to a binding post 32 of a fuse box 33. The latter is provided with a binding post 34 which connects with a lead 35. The opposite lead 36 connects with a binding post 37. The fuse box 33 is provided with another binding post 38 which is connected by a wire 39 with the contact member 28.

From the pivotal connection 29 a wire 40 leads to the electric lamp and communicates with the upper carbon 41. The lower carbon 42 is by means of wires 43, 44 in electrical communication with the pivotal connection 30.

A wire 45 is connected with the wire 40 and with a solenoid 46. From the latter a wire 47 leads to a stationary contact member 48 upon the board 48ª. A contact spring 49 is likewise mounted upon this board and is adapted to engage and disengage the stationary contact member 48. From the contact spring 49 a wire 50 leads to a contact spring 51. The governor 12 is provided with a contact disk 52 adapted to engage and disengage the contact spring 51. The movable parts of the governor are mounted in a metallic frame 53, the latter being connected by a wire 54 with the wires 43, 44.

The bar 24ª (see Fig. 3) is provided with a boss 24ᵇ which is engaged by a hook 56. This hook is integral with a lever 58 mounted upon a pivot 57 and passing through a slot 59 in the board 55. Two plungers 60 pass loosely through this board and are provided with reduced portions 61 having stop pins 62 extending axially through them. Encircling these reduced portions are spiral springs 63 which abut against the plungers 60 and also against a bar 64. The latter is secured rigidly in position by means of spacing pins 64ª. A spring 65 is connected with the lever 58 and serves to give it proper tension.

A casing 66 contains a solenoid 67 provided with a movable armature core 68 the upper end of which is provided with a plunger 69. This plunger is adapted to engage the under side of the lever 58, and so rock this lever that the hook 56 is withdrawn from the boss 24ᵇ, thereby liberating the switch bar 24ª, and the tension of the springs 63 causes the plungers 60 to throw this bar outwardly from the board 55, thereby opening the switch. The solenoid 67 is supported upon a shelf 70 when the parts are in normal condition.

The operation of our device is as follows: The parts being in the position indicated in Fig. 1, and the projector 8 being in action, the film 15 is continuously drawn from the magazine 16 and passed into the magazine 17. The lamp circuit which we designate as the main circuit is now energized as follows: lead 36, binding posts 37, 38, wire 39, contact member 28, knife 26, pivotal connection 30, wire 44, wire 43, lower carbon 42, upper carbon 41, wire 40, pivotal connection 29, knife 25, contact member 27, wire 31, binding posts 32, 34, lead 35 to source of electricity, and thence back to lead 36. This energizes the electric lamp. The wheel connected with the mechanism 14 used for moving the film, confers motion upon the belt 13 and the latter causes the centrifugal governor 12 to be thrown into action. Engagement between the contact members 51, 52 is thus prevented so long as the speed of the film exceeds a predetermined limit. The solenoid 46 is now dead. Suppose that for some reason the mechanism moving the film 15 is brought to a standstill or even slows up beyond the limit above mentioned. The centrifugal governor 12 slows down, the result being that the disk 52 engages the contact spring 51. This completes the following circuit: lead 36, binding post 37, fuse box 33, binding post 38, wire 39, contact member 28, knife 26, pivotal connection 30, wire 44, wire 54, frame 53, governor 12, contact disk 52, contact spring 51, wire 50, contact spring 49, stationary contact 48, wire 47, solenoid 46, wire 45, pivotal connection 29, knife 25, contact 27, wire 31, binding posts 32, 34, lead 35, back through source of electricity through lead 36. The completion of the circuit just traced energizes the solenoid 46 and causes the core 68 to leap upward. The plunger 69 strikes the lever 58 and disengages the hook 56 from the boss 24ᵇ. The spring 63 pressing against the plunger 60 throws the switch knives 25, 26 and handle 24, outward thus opening the switch and extinguishing the light of the electric lamp 10. This being done the film 15 is rendered safe from excessive heat from the lamp. Suppose, now, that the operator desires to use the lamp 10 in connection with the stereopticon 9. He slides the lamp 10 along the ways 11 into its extreme position (indicated by top of Fig. 7) so that the lamp 10 lodges against the contact spring 49 and thus opens the contact made by this spring and the stationary contact member 48. The momentum of the governor 12 and the movable parts connected with it prevents the instantaneous closure of the contact consisting of parts 51, 52, so that when the lamp 10 is moved against the spring contact 49 the latter is disengaged from the stationary contact 48 before the contact disk 52 has time to settle upon the spring contact 51. The result is that the circuit through the solenoid 46 is not closed by the dropping of the disk 52 because this circuit goes through the contact spring 49 and the stationary contact member 48. The lamp therefore continues to burn, the main circuit being endangered. If, now, it be desired to move the lamp 10 back into registry with the projector 8 the operator simply slides the lamp back into its original position indicated in Fig. 7 and starts up the mechanism for moving the film 15. The instant closure of the spring 49 against the stationary contact 48 insures the partial completion of the circuit through the solenoid and yet the solenoid can never be energized except when the governor stops, for the reason that the circuit through the solenoid can only be closed when both conditions occur after one contact between spring 49 and contact member 48, and contact between disk 52 and contact spring 51.

Having thus described our invention, we claim as new and desire to secure by Letters Patent:

1. The combination of a moving picture projector, an electric lamp movable relatively to said projector, and means controllable by the position of said lamp relatively to said projector for lighting and extinguishing said lamp.

2. The combination of a stereopticon, a projector disposed adjacent to said stereopticon, a lamp movable relatively to said projector and to said stereopticon so as to be used with either said projector or said stereopticon at the will of the operator, a switch to be opened and closed by movements of said lamp, electric mechanism connected with said switch for lighting and extinguishing said lamp, a governor co-acting with said projector, and a contact to be opened and closed by said governor, the action of said contact being dependent upon the speed of said governor, said contact being connected with said electric mechanism for lighting and extinguishing said lamp.

3. The combination of a projector for moving pictures, a stereopticon, a lamp common to said projector and said stereopticon, said lamp being movable relatively thereto, speed-controlled mechanism connected with said projector for extinguishing said lamp when the speed of said speed-controlled mechanism drops below a predetermined limit, and means controllable by said lamp for preventing said speed-controlled mechanism from extinguishing said lamp when said lamp is used exclusively with said stereopticon.

4. The combination of a movable electric lamp, a circuit for energizing the same, an electrically-operated switch for opening said circuit, thereby deënergizing said lamp, a circuit connected with said switch for opening the latter, mechanism controllable by the position of said lamp for opening said last-mentioned circuit, and a picture projector to be illuminated by said lamp.

5. The combination of a picture projector, an electric lamp movable relatively to said picture projector for illuminating the same, a circuit connected with said lamp for energizing the latter, and means controllable by movements of said lamp for breaking said circuit.

6. The combination of a projector, a speed-controlled governor connected therewith, a contact connected with said governor and opened and closed by variations in the speed thereof, and an electric lamp in communication with said contact and controllable thereby for illuminating said projector.

7. The combination of a lamp, a picture projector provided with a movable film and with means for actuating said film, and mechanism including a speed governor connected with said means and controllable by movements thereof for extinguishing said lamp.

8. The combination of a picture projector provided with means for supporting a movable film, a governor connected with said projector and having a speed related to that of said film, a lamp for illuminating said film, and means controllable by the speed of said governor for extinguishing said lamp whenever the speed of said film drops below a predetermined limit.

9. The combination of a picture projector provided with means for supporting a movable film, a governor connected with said projector having a speed related to the speed of said film, an electric lamp movable relatively to said projector for illuminating said film, a circuit for energizing said lamp, mechanism controllable by movements of said lamp for opening and closing said circuit, and a contact connected with said governor and controllable by movements thereof for opening and closing said circuit.

In testimony whereof we have signed our names to this specification in the presence of two subscribing witnesses.

LEONARD COLSON.
CHARLES GEBAUER.

Witnesses:
MAX ERDTMANN,
AGNES E. SCHROEDER.